Dec. 7, 1965 HIROMI MORIYAMA ETAL 3,222,486
GAS-FILLED ENCLOSED ELECTRIC SWITCHGEAR
WITH COPPER CONTACTS
Filed May 29, 1963
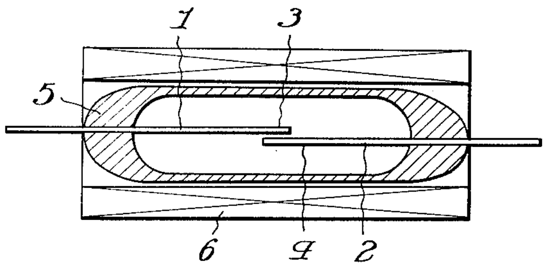

United States Patent Office 3,222,486

Patented Dec. 7, 1965

3,222,486

GAS-FILLED ENCLOSED ELECTRIC SWITCHGEAR WITH COPPER CONTACTS

Hiromi Moriyama, Hiroshi Yamada, Tsunemoto Nakanishi, and Toshikatsu Kiriyama, all of Totsuka-ku, Yokohama-shi, Japan, assignors to Kabushiki Kaisha Hitachi Seisakusho, and Keihin Hitachi Engineering Kabushiki Kaisha, both of Tokyo-to, Japan, and both joint-stock companies of Japan

Filed May 29, 1963, Ser. No. 284,053

Claims priority, application Japan, June 4, 1962, 37/22,323; June 5, 1962, 37/22,484, 37/22,485

3 Claims. (Cl. 200—166)

The present invention relates to enclosed and sealed switch-gear, and more particularly it relates to new and improved enclosed switchgear having highly desirable features.

Heretofore, so-called reed relays, that is, enclosed switchgear of the type consisting of a coil and a switch element inserted therein, the said switch element comprising two magnetic members sealed in a glass tube with their ends which are to function as contacts disposed in mutually opposed positions, are being widely used because of their miniature size, rapid operation, and resistance to atmospheric conditions. The contacts are generally gold plated, and, furthermore, the plated gold is diffused to the base metal. However, this type switchgear is not always satisfactory for uses wherein the control voltage is low, and, at the same time, the control current is low. More specifically, in the low-voltage and low-current range as 30-volt or lower control voltage and 10 ma. or lower control current, or in the case when without switching of a load, only passing of electric current is accomplished, the contact resistance of the contacts increases together with the number of cycles of operation. In some instances, the contact resistance exceeds 1,000 milliohms after a number of tens of million cycles of operation. Such a result is detrimental to A–D transducers for analog computers and logical circuits with several contacts in series connection which require accuracy.

Since the art has heretofore lacked a low-cost method of solving the above-described problem, measures such as changing circuits and using high-priced mercury-contact relays have been unavoidably resorted to.

The present invention, in its broader aspects, contemplates the solution of the above problem through low-cost measures.

More specifically, it is a general object of the invention to provide new and improved switchgear of low price having high performance which far exceeds that of conventional switchgear of similar type.

The nature, principle, and details of the invention will be best understood by reference to the following description, taken in conjunction with the accompanying drawing, which is a longitudinal sectional view of an enclosed switchgear.

Referring to the drawing, the enclosed switchgear shown is used as a so-called reed relay and comprises a coil 6 and a switch element inserted therein, the said switch element consisting of a sealed glass tube 5 and magnetic members 1 and 2 extending from the outside into the interior of the tube 5 with their portions 3 and 4, respectively, to function as contacts disposed in mutually opposed relationship and sealed in together with an inert gas, such as nitrogen, and with hydrogen gas within the said glass tube 5. In general, the contact parts are gold plated and then subjected to high-temperature diffusion treatment in a current of hydrogen gas, whereby approximately 20 microns thickness of a diffused layer of the gold and the base metal (iron-nickel alloy) is obtained.

According to one embodiment of the present invention, copper is used in place of gold. In another embodiment of the invention, copper and gold are used in place of gold alone. Although copper readily becomes a sulfide and readily oxidizes in air and is, therefore, unsuitable for control of extremely low voltages and low currents, it exhibits extremely stable contact resistance in the case when it is caused to diffuse, either by itself or together with gold, in a base metal and is placed in an inert gas, particularly when it is sealed in a gas mixture containing hydrogen, which is reductive.

In order to indicate still more fully the nature of the present invention, the following examples of treatment of contacts are set forth.

*Example 1*

Several base metal members were plated with copper to various thicknesses ranging from 1 to 8 microns and then subjected to diffusion treatment for approximately 50 minutes at a temperature of approximately 900 degrees C. in a current of hydrogen gas. Each of the members so treated was installed in an enclosed switching device of the type described hereinabove, the glass tube of which was sealed while a current of nitrogen gas containing approximately 3 percent of hydrogen was passed therethrough. Each switching device was subjected to 20 million cycles of no-load operation not involving current switching, and then its contact resistance was measured. Average results so obtained were as indicated hereinbelow together with comparative results for base metals plated with gold and with rhodium.

| Plating material | Plating thickness (micron) | Average contact resistance | |
|---|---|---|---|
| | | Initial (milliohm) | After $20\times10^6$ cycles of operation (milliohm) |
| Copper | 1 | 26.0 | 59.3 |
| Do | 3 | 28.5 | 35.0 |
| Do | 6 | 23.0 | 34.3 |
| Do | 8 | 26.0 | 25.6 |
| Gold | 4 | 30.0 | 213 |
| Rhodium | 4 | 41.6 | 53.9 |

It will be observed from the above results that, except for the switching member with copper plating of 1-micron thickness, the switching members according to the present invention exhibit extremely stable contact resistances. It will be further observed that both of the switching members plated with gold and with rhodium exhibit substantially higher contact resistances than those plated with copper to a thickness of 3 microns or more, the values for the case of gold plating being approximately 7 times those for the case of copper plating.

As illustrated above, copper exhibits highly advantageous properties in a so-called reed relay. Moreover, the plating cost for copper is merely ⅓ of that for gold and ⅛ of that for rhodium.

The afore-described hydrogen treatment was carried out at a temperature below 1,083 degrees C., the melting point of copper, and above 700 degrees C., below which the progress of diffusion becomes difficult.

*Example 2*

In another embodiment of the invention, diffused layers of gold, copper, and the base metal were formed through the use of gold and copper in place of only gold. Such layers of gold and copper may be obtained through procedures such as the following:

(1) alloy plating the base metal in a plating solution containing salts of gold and copper, then subjecting the base metal so plated to high-temperature treatment in a current of hydrogen gas;

(2) copper plating the base metal, gold plating thereover, then subjecting the base metal so plated to high-temperature treatment in a current of hydrogen gas;

(3) gold plating the base metal, copper plating thereover, then subjecting the base metal so plated to high-temperature treatment in a current hydrogen gas.

Such procedures are possible because gold and copper are substantially similar in respect to melting points and diffusion coefficients.

As a practical example, several samples were prepared by plating base metal members to a plating thickness of from 0.5 to 1.5 microns, then plating the same with 4 microns of gold. Each sample was then diffusion treated for approximately 50 minutes at a temperature of approximately 900 degrees C. in a current of hydrogen gas and installed in an enclosed switching device of the afore-described construction, the glass tube of which was sealed while a current of nitrogen gas containing approximately 3 percent of hydrogen was passed therethrough. Then each switching device was subjected to 20 million cycles of no-load operation not involving current switching, and then its contact resistance was measured. Average results so obtained were as indicated hereinbelow together with comparative results for base metals plated with only gold.

| Copper plating thickness (micron) | Gold plating thickness (micron) | Average contact resistance | |
|---|---|---|---|
| | | Initial (milliohm) | After $20\times10^6$ cycles of operation (milliohm) |
| ---------------- | 4 | 30 | 213 |
| 0.5 | 4 | 28.5 | 64.6 |
| 1.0 | 4 | 27.9 | 35 |
| 1.5 | 4 | 25.5 | 22.9 |

It will be observed from the above table that the addition of copper plating to gold plating improves the performance of the contact members by a phenomenal amount, and that, in the case of a copper plating thickness of 1.5 microns, the contact resistance value even decreases after 20 million cycles of operation. Thus, it is to be observed that, in a so-called reed relay, copper plating produces highly advantageous results also when combined with gold plating. Moreover, the increase in total cost due to the addition of copper is extremely small.

Since it is obvious that many changes and modifications can be made in the above-described details without departing from the nature and spirit of the invention, it is to be understood that the invention is not to be limited to the details described herein except as set forth in the appended claims.

What is claimed is:

1. An enclosed type switchgear comprising at least two magnetic members, each having an electrical contact part which is copper plated, a gas-tight vessel containing in a sealed-in state the said electrical contact parts of the said magnetic members together with an inert gas containing a reductive gas, the said electrical contact parts being in mutually opposed juxtaposition suitable for switching operation, and means to actuate the said electrical contact parts in switching operation.

2. The switchgear as defined in claim 1, wherein said reductive gas is hydrogen.

3. An enclosed type switchgear comprising at least two magnetic members, each having an electrical contact part provided with a plating selected from the group consisting of gold plus copper and gold-copper alloy, the quantity of said copper, in terms of its plating thickness, being at least 0.5 micron; a gas-tight vessel containing in sealed-in state said electrical contact parts together with an inert gas containing a reductive gas; said electrical contact parts being in mutually opposed juxtaposition suitable for switching operations; and means for actuating said electrical contact parts in switching operation.

References Cited by the Examiner

UNITED STATES PATENTS 3,139,669 7/1964 Gwyn ---------------- 29—155.55
3,163,923 1/1965 Lehmann et al. ---- 29—155.55
3,164,708 1/1965 Theobald ----------- 200—166
3,166,660 1/1965 Gribble ------------ 200—166

BERNARD A. GILHEANY, *Primary Examiner.*